Oct. 26, 1965    R. J. BUSH    3,213,584
GASKETS
Filed July 31, 1963

INVENTOR.
RUSSELL J. BUSH
BY
Meyer, Baldwin, Doran & Egan
ATTORNEYS.

United States Patent Office 3,213,584
Patented Oct. 26, 1965

3,213,584
GASKETS
Russell J. Bush, Dayton, Ohio, assignor to The Standard Products Company, Cleveland, Ohio, a corporation of Ohio
Filed July 31, 1963, Ser. No. 298,979
3 Claims. (Cl. 52—400)

This invention relates to sealing means and particularly to a resilient strip gasket structure.

The invention has for its primary object the provision of an article of the aforesaid nature which is characterized by its structural simplicity, inexpensive manufacturing costs, the attractive forms in which it may be made, and the particularly effective manner in which it performs its function.

More particularly, an object of this invention is to provide a strip gasket structure having a self-retaining anchor portion, insertable in an opening between two members to be sealed, which is so formed as to positively increase its resistance to removal from the opening in response to a force tending to move it outwardly from said opening.

Another object of the invention is to provide an improved anchor portion for a resilient strip gasket structure of the above type, said anchor portion having longitudinal ribs which are angled away from the direction of insertion of the anchor into the opening and which has distal edge portions so formed as to cause said ribs to tend to roll back on themselves when there is an attempt to remove said anchor from the opening.

Further objects of the present invention and a number of its advantages will be referred to in or will be evident from the following description of three embodiments of the invention as illustrated in the accompanying drawings.

Before the articles illustrated are specifically described, it is to be understood that the invention here involved is not limited to the structural details shown since resilient strip gasket structures embodying the present invention may take various forms. It is also to be understood that the phraseology or terminology herein employed is for the purpose of description and not of limitation since the scope of the present invention is denoted by the appended claims.

Figure 1:
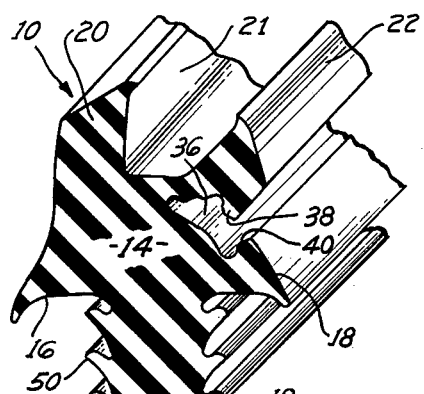
FIG. 1 is a fragmentary perspective of a portion of a glazing gasket embodying the present invention.

Referring now to FIG. 1 of the drawings, the numeral 10 denotes generally a glazing gasket for use in mounting a pane of glass or plastic in a channeled window frame. Said glazing gasket is made of a resilient material such as natural or synthetic rubber and may be extruded, molded, or otherwise formed. The glazing gasket 10 has a downwardly extending anchor portion 12 surmounted by an enlarged body portion 14. Said body portion affords a pair of laterally projecting lips 16 and 18, an upwardly projecting seat portion 20, and a laterally and upwardly projecting hinged portion 22.

Figure 2:
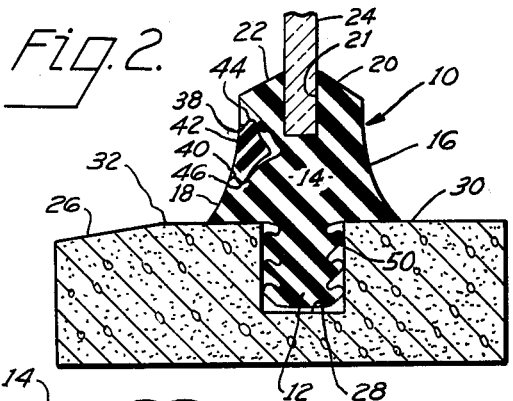
FIG. 2 is a section showing the glazing gasket of FIG. 1 seated in a window channel.

FIG. 2 shows the manner in which the glazing gasket is used to mount a pane of glass 24 in a window frame 26. The window frame 26 is formed or made of concrete, wood, or other suitable material and has a rectangular channel 28 therein for receiving the glazing gasket 10. In use of said glazing gasket, the anchor portion 12 is forcefully inserted into the rectangular channel 28 whereby the laterally projecting lips 16 and 18 are forcefully seated against coplanar upper surfaces 30 and 32 respectively of the window frame 26. The glass 24 is then seated in an L-shaped seat 21 provided in the seat portion 20, and the hinged portion 22 is pivoted upwardly against the opposite face of the glass thereby affording a U-shaped channel for gripping the edge of said glass. Between the lip 18 and the hinged portion 22, there is provided a continuous, irregularly shaped groove 36 having inwardly projecting lips 38 and 40 at the mouth of said groove. A lock strip 42 is provided which has oppositely projecting ribs 44 and 46. The lock strip 42 is adapted to be forcefully inserted into the groove 36 with the ribs 44 and 46 locked behind the lips 38 and 40 respectively whereby the hinged portion 22 is held resiliently and firmly against the glass 24.

It will be understood that the above description regarding the mounting of the glass 24 applies to all four sides of a window frame whereby all four edges of a rectangular plane of glass are held firmly and resiliently in place.

Figure 3:
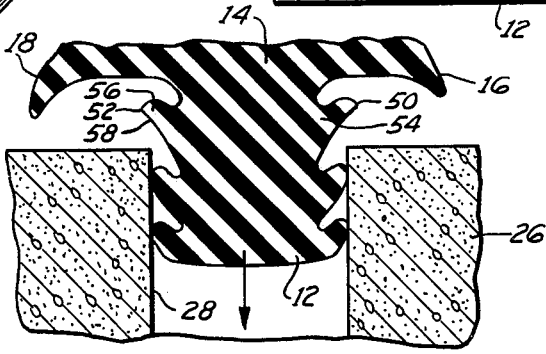
FIG. 3 is an enlarged fragmentary section showing the gasket of FIG. 1 being inserted into the window channel.
Figures 4, 5:
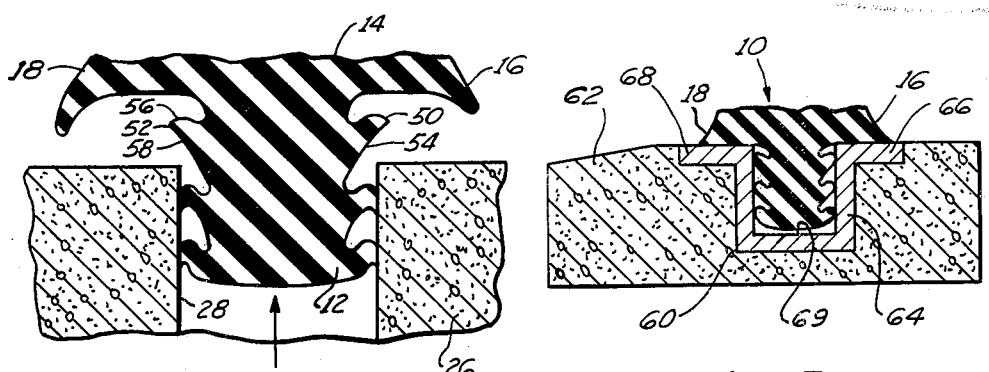
FIG. 4 is a section similar to FIG. 3 showing the gasket being removed from the window channel.
FIG. 5 is a fragmentary view similar to FIG. 2 showing a modified form of installation of the glazing gasket of FIG. 1.

Referring now particularly to FIGS. 3 and 4, the anchor portion 12 is very generally rectangular in shape and is provided at each lateral side with a plurality of upwardly and outwardly obliquely angled anchoring ribs 50. The ribs 50 are vertically spaced from each other and are substantially identical in form. The anchoring ribs 50, as herein disclosed, are angled away from the vertical approximately 35° and the horizontal distance between the extreme tips or edges 52 of the ribs is substantially greater than the width of the rectangular channel 28.

Each anchoring rib 50 has a thickened base 54 which divergently blends into the main body of the anchor portion 12. The upper surface 56 of each said anchoring rib immediately adjacent to the edge 52 of said rib is convexly upwardly rounded, and the lower surface 58 thereof below said edge is slightly concavely rounded with said surfaces converging into a substantially sharp edge at the tip or edge 52. Each edge 52 is disposed substantially below the uppermost point of the upper convex surface 56.

As shown in FIG. 3, when the anchor portion 12 is forcefully inserted into the rectangular channel 28, opposite anchoring ribs 50 are compressed inwardly due to the resilient nature of the material from which the glazing gasket is made. This action decreases the angularity of the anchoring ribs 50 and causes the concavely rounded surfaces 58 to be flattened against the inner, vertical walls of the rectangular channel 28. In FIG. 3 of the drawings, the anchor portion 12 is shown only partially inserted into the channel 28 for purposes of illustration, but it will be understood that in use of the invention said anchor portion is disposed within said channel as far as the laterally projecting lips 16 and 18 will allow. Said laterally projecting lips preferably droop or are curved downwardly adjacent to their distal edges whereby said edges are forcibly and resiliently flattened down against the flanges 30 and 32 when the glazing gasket is completely seated. The outwardly biased anchoring ribs 50 press firmly against the inner walls of the channel 28 thereby resisting the outward pull created by the lips 16 and 18 and thereby firmly anchoring the glazing gasket 19 in position.

FIG. 4 of the drawings shows the anchor portion 12 partially forcefully removed from the rectangular channel 28 to illustrate the gripping action of the anchoring ribs 50. An upward force applied to the anchor portion 12 causes the anchoring ribs 50 to tend to straighten laterally outwardly thereby forcing the sharp edges 52 into greater frictional contact with the inner walls of the channel 28. This tendency of the anchoring ribs to move outwardly greatly compresses the ribs and causes the edges 52 to grip more tightly against the walls of the channel 28. Facilitated by the convex surfaces at 56, said ribs tend to roll back on themselves thereby increasing the concavity at each concave underside of each rib at 58. This further increases the tendency of the anchoring ribs 50 to project laterally outwardly with the result that the greater the force applied toward removing the anchor portion, the greater the tendency of the ribs to roll back upon themselves and the greater the resistance of all the ribs to the removal of said anchor portion.

FIG. 5 shows a modified form of installation of the glazing gasket 10 wherein there is provided a metal insert 60 which is embedded or recessed into a window frame 62. Said insert is hat shaped in section having a U-shaped central portion 64 and laterally projecting, coplanar flanges 66 and 68. The U-shaped central portion 64 provides a rectangular channel 69 which is similar to the channel 28 in FIGS. 2–4. As illustrated, the anchor portion 12 is forcibly inserted in the channel 69 with the lips 16 and 18 pressed tightly against the upper surfaces of the flanges 66 and 68 respectively to effect a tight seal.

Figure 6:
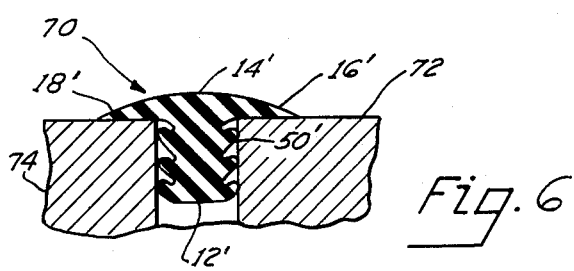
FIG. 6 is a section of a crack sealing gasket embodying the present invention and applied between two spaced blocks.

FIG. 6 shows a crack sealing gasket, generally indicated at 70, which is adapted to seal and bridge the space between two adjacent members such as two spaced blocks 72 and 74 of any suitable material. The sealing gasket 70 has an anchor portion 12' which is provided with anchoring ribs 50' at the sides thereof. Said anchor portion 12' is surmounted by a relatively flat body portion 14' having laterally projecting lips 16' and 18'. The anchor portion 12' and the ribs 50' are identical in form and function with the anchor portion 12 and the anchoring ribs 50 and are adapted to frictionally engage adjacent end surfaces of the blocks 72 and 74 in the same manner as described in connection with the first embodiment of the invention. With the anchor portion 12' firmly inserted in place, the laterally projecting lips 16' and 18' overlie and seat firmly upon the upper surfaces of blocks 72 and 74 respectively. Thus the two blocks are sealed relative to each other.

It will be understood that many changes in the details of the invention as herein described and illustrated may be made without, however, departing from the spirit thereof or the scope of the appended claims.

What is claimed is:

1. A gasket structure made of resilient material comprising a generally rectangular anchor portion adapted to be inserted into an opening defined by a pair of substantially parallel, laterally spaced wall portions; a body portion disposed above said anchor portion; said body portion having means projecting laterally outwardly from said body portion beyond the lateral extent of said anchor portion and adapted to extend laterally beyond the wall portions to seal the opening; each lateral side of said anchor portion having obliquely, upwardly and outwardly directed ribs angled in the direction of said laterally projecting means; each said rib having a convex upper surface and a concave lower surface; said surfaces converging laterally into a substantially sharp edge, and said convex upper surface extending substantially above said edge; said ribs adapted to be compressed with their concave surface portions flattened when said anchor portion is inserted into the opening and adapted to roll back on themselves by means of said convex surface portion engaging the walls of the opening when a force tends to remove said anchor portion from the opening.

2. A crack sealing gasket structure made of resilient material comprising a generally rectangular anchor portion adapted to be inserted into an opening defined by a pair of substantially parallel, laterally spaced wall portions; a body portion disposed above said anchor portion; outwardly tapered lips projecting laterally outwardly from said body portion beyond the lateral extent of said anchor portion and adapted to extend laterally beyond the wall portions to seal the opening; said body portion and said lips affording a smooth bridging surface across said opening; each lateral side of said anchor portion having obliquely upwardly and outwardly directed ribs angled in the direction of said lips; each said rib having a convex upper surface portion and a concave lower surface portion; said surface portions converging laterally into a substantially sharp edge, and said convex upper surface portion extending substantially above said edge; said ribs adapted to be compressed with their concave surface portions flattened when said anchor portion is inserted into the opening and adapted to roll back on themselves by means of said convex surface portion engaging the walls of the opening when a force tends to remove said anchor portion from the opening.

3. A glazing gasket structure in strip form made of resilient material comprising a generally rectangular anchor portion adapted to be inserted into an opening defined by a pair of substantially parallel, laterally spaced wall portions; a body portion disposed above said anchor portion; means projecting upwardly from said body portion for seating an edge portion of a window pane; outwardly tapered lips projecting laterally outwardly from the base of said body portion beyond the lateral extent of said anchor portion and adapted to extend laterally beyond the wall portions and seal the opening; each lateral side of said anchor portion having obliquely outwardly and upwardly angled ribs; each said rib having a convex upper surface portion and a concave lower surface portion; said surface portions converging laterally into a substantially sharp edge, and said convex upper surface portion extending substantially above said edge; said ribs adapted to be compressed with their concave surface portions flattened when said anchor portion is forcefully inserted into said channel and adapted to roll back on themselves by means of said convex surface portions engaging the wall portions of the opening when a force tends to remove said anchor portion from the opening.

References Cited by the Examiner

UNITED STATES PATENTS

| | | | |
|---|---|---|---|
| 1,998,791 | 4/35 | Schanz | 20—69 |
| 2,230,688 | 4/41 | Irwin | 94—18.2 |
| 2,819,065 | 1/58 | Jones. | |
| 3,068,617 | 12/62 | Borski | 50—120 |

HARRISON R. MOSELEY, *Primary Examiner.*